May 18, 1937.    O. DRAPÁK ET AL    2,080,859
DOVETAIL MILLING MACHINE
Filed Dec. 3, 1934    2 Sheets-Sheet 2

O. Drapák
A. Drapák
J. Drapák
    inventors

By Glascock Downing & Seebold
            Attys.

Patented May 18, 1937

2,080,859

UNITED STATES PATENT OFFICE 2,080,859

DOVETAIL MILLING MACHINE

Otto Drapák, Arnošt Drapák, and Jindřich Drapák, Rochlitz, near Reichenberg, Czechoslovakia Application December 3, 1934, Serial No. 755,806
In Czechoslovakia December 14, 1933

5 Claims. (Cl. 144—144)

This invention relates to a dovetail-milling machine which is employed for the manufacture of dovetails, which serve for connecting together slabs or panels of wood, a rotating milling cutter being employed as the cutting tool, which is guided by means of a template on the copying principle.

Hitherto comb-like templates have been employed for this process, on which the milling cutter was guided by means of a roller. Apart from the fact that such templates only admit of the manufacture of a limited number of dovetails, they are also expensive, so that the cost of the machine is materially increased when a number of such templates have to be kept in stock for the production of dovetails of different profiles.

According to the present invention a single-toothed template is employed, the profile of which corresponds merely to one space between the dovetails, a pin being moved over the profile of the template, and taking the milling cutter with it in its movement in one direction, by means of a bar connected therewith, whereas during the return movement of the pin the milling cutter remains stationary. This renders it possible, by repeatedly moving the pin along the template, to produce any number of dovetails without chucking the work.

The invention further comprises a driving or clamping device for the driving of the milling cutter frame during the forward movement of the pin, and also means for clamping the boards.

For driving the milling tool there may be employed any machine employed in the workshop which is provided with an electric motor, or else it may be driven indirectly, for instance by means of a flexible shaft or by means of compressed air. The machine may be constructed as a portable machine, so that it can be installed on any workshop table, for instance on a carpenter's planing bench.

A constructional form of the dovetail milling machine according to the invention is shown by way of example in the accompanying drawings.

Figure 1:
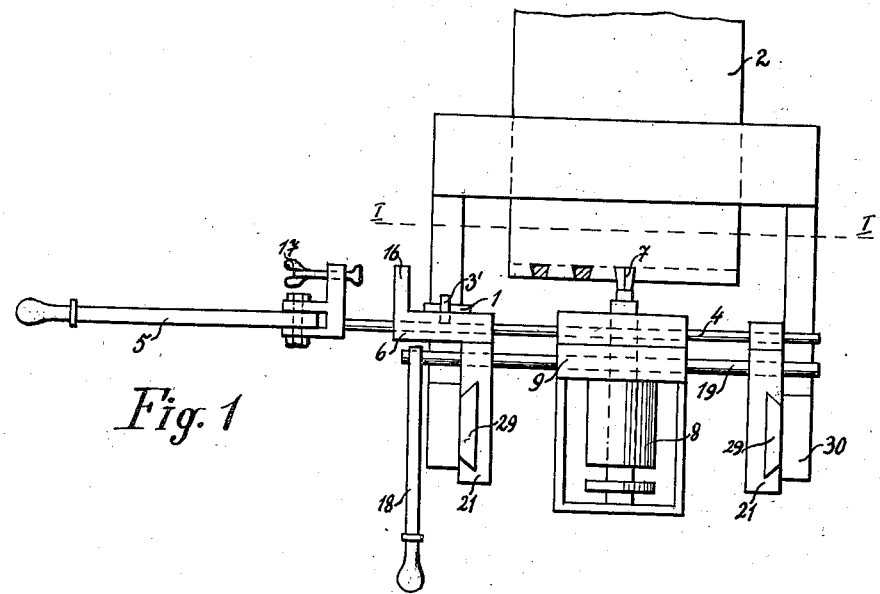
Figure 1 is an elevation of the machine.
Figure 2:
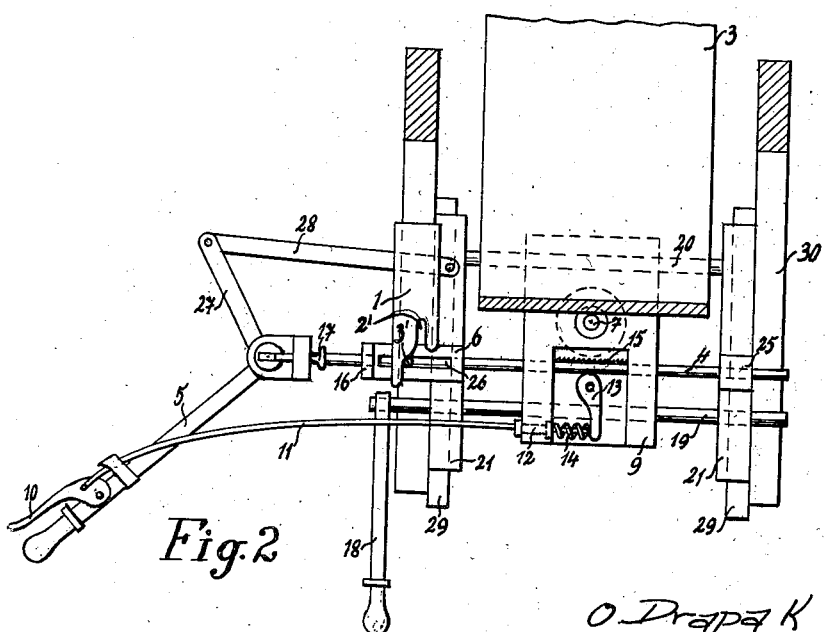
Figure 2 is a plan with partial section along the line I—I in Figure 1.

The template 1 is exchangeable and secured to the frame 30 of the machine. This template is provided with a notch 2' which corresponds to the dovetails to be made in the edges of the boards. In the present case, two boards 2 and 3 are clamped vertically together by means of clamps (not shown) and the dovetailing is effected in one operation, that is to say, tenon and notch are simultaneously milled in the corresponding boards. The pin 3' moves along the notch 2' in the template 1 and is secured to the bar 4 adapted to move longitudinally in the cylindrical members 6, 25. The said pin 3' projects from a longitudinal slot 26 (Fig. 2), arranged in the cylindrical member 6, into the notch 2' in the template. The longitudinal movement of the bar 4 is effected by means of the double-armed lever 5, 27 which is pivotally connected to the bar 4. The arm 27 is pivotally connected to the one-armed lever 28. By means of this lever arrangement and during a movement of the lever 5, a straight line guidance of the bar 4 in the cylindrical members 6, 25 is effected. The pin 3' moves in the slot 26 in the cylindrical member 6. The bar 4 passes through the frame 9 of vertical driving motor 8 and is adapted to be engaged and disengaged with the frame by means of a tappet device to be described below. Consequently, the bar 4 takes with it the frame 9 of the motor 8 slidably mounted on the shafts 19, 20, and also the cutter 7, or the movement of the bar 4 takes place without taking along the frame or the cutter. The longitudinal movement of the bar 4 is limited in one direction by the stop 16 provided on the cylindrical member 6 and the adjustable screw 17 bearing against the stop 16. The longitudinal movement of the bar 4 is limited in the opposite direction by the pin 3' coming in contact with the finger of the template 1. The length of the movement of the bar and also of the cutter can be regulated by adjusting the screw 17. A different number of milled dovetails per decimeter corresponds to the varying adjustment of the screw 17.

Figure 3:
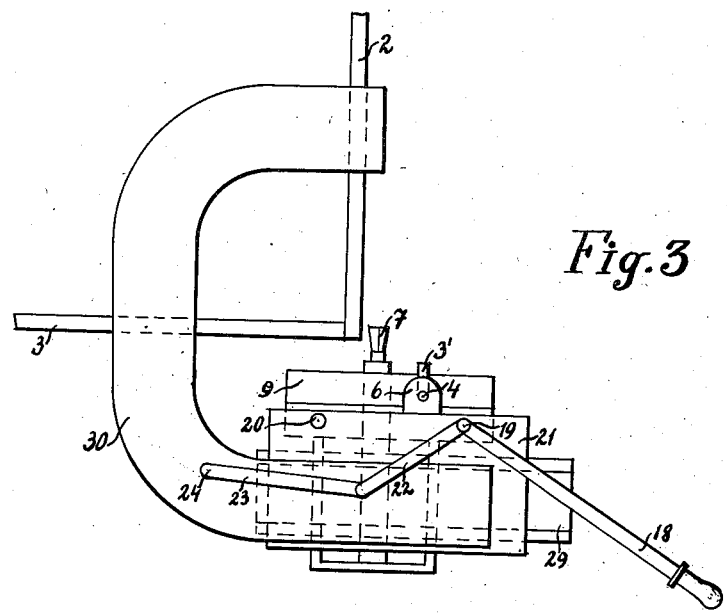
Figure 3 is a side elevation, one of the two lever systems being omitted for the sake of clearness.

In order that the pin 3' can describe the periphery of the notch 2', it must also be able to make a movement transverse to the movement of the bar 4. For this purpose, the cylindrical members 6, 25 are arranged on the slide 21 which is adapted to slide in the desired direction on the slide rest 29. The movement of the slide 21 is effected by means of the double-armed lever 18, 22 (Fig. 3) which is keyed onto the shaft 19. This shaft like the shaft 20 is also mounted in the slide 21. The arm 22 is pivotally connected to the arm 23 rotatably mounted on the machine frame 30 at 24. If the lever 18 is moved, a corresponding straight line guidance of the slide 21 on the slide rest 29 is effected and also the movement of the frame 9 mounted in the slide by means of the shafts 19, 20. Consequently the milling cutter 7 is moved transversely to the longitudinal movement of the bar 4.

Since these two movements may be effected independently of each other and simultaneously, the pin 3' can describe any profile.

If a dovetail is milled to the finish, it is necessary according to the invention that the levers 18 and 5 make their return movement so that the next dovetail can be milled out. The bar 4 must not take with it the frame 9 during the return movement so that the milling cutter will remain in the new position. An example of the tappet device, which releasably connects the frame 9 with the bar 4 is shown in Figure 4 and is also obvious from Figure 2.

Figure 4:
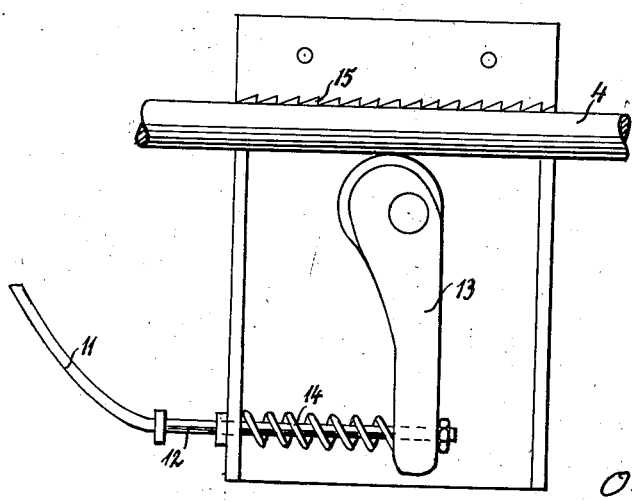
Figure 4 is a plan on an enlarged scale of the means for driving or releasing the frame.

The lever 10 (Fig. 2) is connected to the lever 13 by means of the tension wire 11 and bolt 12 (Fig. 4). When the lever 10 is pressed, this movement is transmitted to the bolt 12 which moves against the spring 14 and so rotates the lever 13 that the eccentric head of the lever presses the bar 4 against the toothed jaw 15 secured in the frame 9. The frame is thereby connected to the bar 4 and must follow its movements. If, however, the lever 10 is released, the eccentric lever 13 rotates back again in consequence of the action of the spring 14, the bar 4 is released and moves without the frame and the milling cutter is carried along thereby. In this manner by repeatedly moving the pin 3' along the profile of the template, which movement is caused by the two levers 5 and 18, any number of dovetails will be made, a template being used the profile of which corresponds merely to one space between the dovetails.

What is claimed is:

1. A dovetail milling machine with a rotary cutter adapted to be guided by means of a template the profile of which corresponds to only one notch between two dovetails, comprising a frame, a rotating milling cutter mounted on said frame, a longitudinal bearer, a copying pin carried by the longitudinal bearer and adapted to follow the outline of the template, and tappet members by means of which the longitudinal bearer takes the milling cutter with it in its movement in one direction but not during the return movement, said tappet members comprising a jaw secured to the frame carrying the milling cutter, a member adapted to connect said bearer with said jaw so as to prevent relative movement between the bearer and the jaw in a longitudinal direction, a manually controlled element for actuating said member and moving the latter into engagement with said jaw, and means for automatically releasing said member from engagement with said jaw when the manually controlled element is released.

2. A dovetail milling machine with a rotary cutter adapted to be guided by means of a template the profile of which corresponds to only one notch between two dovetails, comprising a frame, a rotating milling cutter mounted on said frame, a longitudinal bearer, a copying pin carried by the longitudinal bearer and adapted to follow the outline of the template, and tappet members by means of which the longitudinal bearer takes the milling cutter with it in its movement in one direction but not during the return movement, said tappet members comprising a jaw secured to the frame carrying the milling cutter, a member adapted to connect said bearer with said jaw so as to prevent relative movement between the bearer and the jaw in a longitudinal direction, a manually controlled element for actuating said member and moving the latter into engagement with said jaw when the manually controlled element is released, and adjustable stops for limiting the longitudinal movement of the bearer and the copying pin carried thereby for adjustably varying the width of the notches to be milled.

3. A dovetail milling machine with a rotary cutter adapted to be guided by means of a template the profile of which corresponds to only one notch between two dovetails, comprising a frame, a rotating milling cutter mounted on said frame, a longitudinal bearer extending through said frame and movable longitudinally relative to said frame, a copying pin carried by the longitudinal bearer and adapted to follow the outline of the template, and tappet members by means of which the longitudinal bearer takes the milling cutter with it in its movement in one direction but not during the return movement, said tappet members comprising a jaw secured to the frame carrying the milling cutter, a member adapted to connect said bearer with said jaw so as to prevent relative movement between the bearer and the jaw in a longitudinal direction, a manually controlled element for actuating said member and moving the latter into engagement with said jaw, and means for automatically releasing said member from engagement with said jaw when the manually controlled element is released, a transversely movable slide supporting the frame, said frame being movable transversely with said slide, and hand lever mechanism for occasioning the longitudinal movement of the bearer and the transverse movement of the slide for causing the copying pin to follow the outline of the template notch.

4. A dovetail milling machine with a rotary cutter adapted to be guided by means of a template the profile of which corresponds to only one notch between two dovetails, comprising a frame, a rotating milling cutter mounted on said frame, a longitudinal bearer, a copying pin carried by the longitudinal bearer and adapted to follow the outline of the template, and tappet members by means of which the longitudinal bearer takes the milling cutter with it in its movement in one direction but not during the return movement, said tappet members comprising a toothed jaw carried by the frame carrying the milling cutter, a cam lever adapted to press the longitudinal bearer against said toothed jaw so as to prevent relative movement between the bearer and the jaw in a longitudinal direction, a hand lever for actuating the cam lever, and a spring for returning the cam lever to its idle position when the hand lever is released, thereby releasing the longitudinal bearer from the jaw of said milling cutter frame.

5. A dovetail milling machine as claimed in claim 3, in which the hand lever mechanism for occasioning transverse movement of the slide comprises two links pivotally connected with one another, one of said links being pivoted to a stationary part of the machine and the other being pivotally mounted on the slide, a hand lever for actuating said links, said hand lever being adapted to rotate the second link about its pivot and thereby alter the angle between the links and consequently the distance between their pivots.

OTTO DRAPÁK.
ARNOŠT DRAPÁK.
JINDŘICH DRAPÁK.